United States Patent
Akai et al.

(10) Patent No.: US 10,131,258 B2
(45) Date of Patent: Nov. 20, 2018

(54) VEHICLE SEAT

(71) Applicants: TS TECH CO., LTD., Saitama (JP); HONDA MOTOR CO., LTD., Tokyo (JP)

(72) Inventors: Kota Akai, Tochigi (JP); Shigekazu Otake, Tochigi (JP); Koichiro Wada, Wako (JP); Daiga Ito, Wako (JP)

(73) Assignees: TS TECH CO., LTD., Saitama (JP); HONDA R&D CO., LTD., Tokyo (JP)

( * ) Notice: Subject to any disclaimer, the term of this patent is extended or adjusted under 35 U.S.C. 154(b) by 42 days.

(21) Appl. No.: 15/491,509

(22) Filed: Apr. 19, 2017

(65) Prior Publication Data
US 2017/0305309 A1    Oct. 26, 2017

(30) Foreign Application Priority Data

Apr. 22, 2016 (JP) .................................. 2016-085857

(51) Int. Cl.
 *B60N 2/75*  (2018.01)
 *B60N 2/68*  (2006.01)

(52) U.S. Cl.
 CPC ............. *B60N 2/682* (2013.01); *B60N 2/757* (2018.02); *B60N 2/753* (2018.02)

(58) Field of Classification Search
 CPC ......... B60N 2/682; B60N 2/757; B60N 2/753
 USPC .................... 297/113, 411.29, 411.32, 411.39
 See application file for complete search history.

(56) References Cited

U.S. PATENT DOCUMENTS

| | | | | |
|---|---|---|---|---|
| 5,292,171 A | * | 3/1994 | Harrell ................... | B60N 2/757 297/113 |
| 6,328,384 B1 | * | 12/2001 | Yamauchi ............. | B60N 2/753 297/411.29 |
| 7,114,772 B2 | * | 10/2006 | Kobayashi ............ | B60N 2/206 297/188.04 |
| 8,016,359 B2 | * | 9/2011 | Dillinger ............... | B60N 2/753 297/411.32 |
| 8,449,029 B2 | * | 5/2013 | Runde ................... | B60N 2/757 297/113 |
| 8,827,369 B2 | * | 9/2014 | Izawa ..................... | A47C 7/54 297/411.32 |
| 9,022,463 B2 | * | 5/2015 | Cha ....................... | B60N 2/757 297/113 |
| 2013/0140859 A1 | * | 6/2013 | Yamaki ................ | B60N 2/4235 297/216.13 |
| 2014/0232161 A1 | * | 8/2014 | Mitsuhashi ............ | B60N 2/68 297/452.18 |

(Continued)

FOREIGN PATENT DOCUMENTS

DE   10102131 A1 *  8/2002  ............ B60N 2/753
JP   2012051492 A   3/2012

*Primary Examiner* — Syed A Islam
(74) *Attorney, Agent, or Firm* — Armstrong Teasdale LLP

(57) ABSTRACT

A pair of brackets (25, 30) are provided on either side of a seat back frame (10), each bracket defining a support hole (27, 31) for rotatably supporting a support shaft (41) of an arm rest, and a guide slot (28, 32) for guiding a corresponding guide pin (42B, 42C) of the arm rest along an arcuate path centered around the corresponding support hole. The two guide slots are offset from each other, and the guide pins are offset from each other in a corresponding manner in side view so that the two brackets may be offset from each other. Thereby, the layout of the brackets for rotatably supporting the arm rest can be selected in an advantageous manner.

12 Claims, 6 Drawing Sheets

(56) References Cited

U.S. PATENT DOCUMENTS

| | | | | |
|---|---|---|---|---|
| 2016/0297334 A1* | 10/2016 | Salenbien | ............... | B60N 2/919 |
| 2017/0066351 A1* | 3/2017 | Siqueira | ................. | B60N 2/757 |
| 2017/0313226 A1* | 11/2017 | Akaike | ................. | B60N 2/682 |
| 2018/0118069 A1* | 5/2018 | Miyazaki | ................. | A47C 7/54 |

* cited by examiner

VEHICLE SEAT

TECHNICAL FIELD

The present invention relates to a vehicle seat having a retractable arm rest.

BACKGROUND ART

A vehicle seat having an arm rest that can be retracted into the seat back is known in the art. See JP2012-51492A, for instance. In the rear seat disclosed in this patent document, a pair of brackets are fixedly secured to the seat back frame, and a support shaft fixedly supporting an arm rest frame is pivotally supported by the brackets. Each bracket is formed with an arcuate slot centered around the pivot center, and a pair of guide pins projecting from the arm rest frame are fitted into the guide slots. The guide pins consist of two ends of a single rod extending laterally across the arm rest frame, and are received by the respective guide slots. The terminal ends of the guide slots define the deployed position and the retracted position of the arm rest, respectively. One of the guide pins is provided with frictional members frictionally engaging the surfaces of the brackets, respectively, as the arm rest frame pivots so that the arm rest may be retained at any desired angular position with respect to the seat back.

The brackets are each required to have a support hole for rotatably supporting the arm rest, and a guide slot for defining the angular range of the movement of the arm rest. Therefore, the size of each bracket is so significant that it may not be possible to attach the brackets to the respective side frames at a same elevation without interfering with other components of the seat back.

Furthermore, as the brackets are required to have a certain mechanical stiffness and strength, relatively stiff parts of the seat back frame are required to be selected for attaching the brackets. However, oftentimes, the side frames of the seat back have mutually different configurations, and may not have parts suitable for mounting the brackets at a same elevation. Therefore, one of the side frames may have to be reinforced solely for enabling the side frame to withstand the loading of the arm rest.

SUMMARY OF THE INVENTION

The present invention was made in view of such problems of the prior art, and has a primary object to provide a vehicle seat having a retractable arm rest which allows brackets for rotatably supporting the arm rest to be arranged in an advantageous manner To achieve such an object, the present invention provides a vehicle seat, comprising: a seat back frame (10); an arm rest frame (40); a pair of support pins (41A, 41B) fixedly attached to the arm rest frame, and projecting in either lateral direction; a pair of guide pins (42B, 42C) fixedly attached to the arm rest frame, and projecting in either lateral direction; a pair of brackets (25, 30) provided on either side of the seat back frame, each bracket defining a support hole (27, 31) for rotatably supporting a corresponding one of the support pins and a guide slot (28, 32) for guiding a corresponding one of the guide pins along an arcuate path centered around a center of the corresponding support hole; wherein the two brackets are offset from each other, and the two support holes are coaxial to each other in side view; and wherein the two guide slots are offset from each other, and the guide pins are offset from each other in a corresponding manner in side view.

Because the two guide slots are offset from each other, the brackets can be arranged in a mutually offset relationship. Therefore, a greater freedom can be given to the positioning of the brackets so that the brackets may be attached to advantageous parts of the seat back frame. As a result, the weight of the seat back frame may be minimized, and the manufacturing cost can be minimized Preferably, the guide pins are formed by two lateral ends of a guide shaft (42) having a bend (42A) in an intermediate part thereof so that the two lateral ends are offset relative to each other in a parallel relationship. Thereby, the stiffness of the guide pins can be ensured, and the number of component parts can be minimized The arm rest frame may include a pair of side frames (47) extending along either side of the arm rest frame, and the guide shaft is fixedly attached to the side frames. The guide shaft contributes to the stiffness of the arm rest frame so that the weight and cost of the arm rest frame can be minimized.

Preferably, the support pins are formed by two lateral ends of a support shaft (41) which is fixedly attached to the side frames. Thereby, the stiffness of the support pins can be maximized, and the arm rest frame is favorably reinforced by the support shaft.

According to a preferred embodiment of the present invention, the seat back frame includes a lower cross frame (14) extending laterally in a lower part of the seat back frame, a first side frame including an upper side frame (16) and a lower side frame (15) which are joined to each other at a mutually overlapping portion (22), and connected to the lower cross frame at a lower end of the lower side frame, a second side frame (18) having a lower end connected to the lower cross frame at a junction located at a lower elevation than the overlapping portion, and an upper cross frame (17) having two lateral ends connected to upper ends of the upper side frame and the second side frame, respectively, wherein one of the brackets is attached to the overlapping portion, and the other bracket is attached to the junction between the second side frame and the lower cross frame.

In this embodiment, the brackets can be attached to relative stiff parts of the seat back frame so that the stiffness of the brackets can be maximized without any additional expenses or without adding weight to the seat back frame.

Preferably, the lower side frame comprises a channel member having an open side facing the second side frame, and a lower end of the upper side member is received in the open side of the lower side frame at the overlapping portion, wherein the one bracket is attached to the lower side frame at the overlapping portion.

As the overlapping portion is provided with a relatively high stiffness, the one bracket can be supported in a secure manner by choosing this part of the seat back frame for attaching the one bracket.

Preferably, the upper cross frame and the upper side frame are formed by a single continuous pipe member.

Thereby, the structure of the upper part of the seat back frame can be simplified, and the stiffness of the overlapping portion can be maximized owing to a favorable combination of a channel member and a pipe member.

In a preferred embodiment of the present invention, the seat is configured to seat two occupants, and the second side frame consists of a center frame positioned centrally in the seat.

In this case, the first side frame and the second side frame are typically given with mutually significantly different configurations so that a particularly significant gain can be obtained by utilizing the present invention.

Preferably, the other bracket may be attached to a junction between the lower end of the center frame and the lower cross frame.

In a preferred embodiment of the present invention, the support hole of one of the brackets is located adjacent to a lower edge thereof, and the corresponding guide slot extends in a generally upper part of the one bracket, and the support hole of the other bracket is located adjacent to an upper edge thereof, and the corresponding guide slot extends in a generally lower part of the other bracket.

Thereby, the vertical offset between the two brackets can be increased. If the lower edge of the one bracket extends further downward in a free end part where the support hole is formed than a base end part where the one bracket is attached to the overlapping portion, the vertical offset of the two brackets can be increased even further.

Optionally, one of the support pins may be provided with a frictional member and a shaft extension configured to apply an axial force that urges the frictional member against the corresponding bracket.

Thereby, the arm rest can be retained at any angular position relative to the seat back.

In a preferred embodiment of the present invention, one of the guide slots is provided with an enlarged portion, and the corresponding guide pin is provided with a radial flange at a free end side thereof, the radial flange having a diameter smaller than a width of the enlarged portion but greater than a width of a remaining part of the guide slot.

Thereby, the guide pin can be fitted into the corresponding guide slot with ease, and an inadvertent disengagement of the guide pin from the guide slot can be avoided by using a highly simple structure.

According to the present invention, the freedom of the layout for the brackets for rotatably supporting an arm rest of a vehicle seat can be improved while providing various advantages in structural design.

BRIEF DESCRIPTION OF THE DRAWING(S)

DESCRIPTION OF THE PREFERRED EMBODIMENT(S)

An embodiment of a vehicle seat according to the present invention is described in the following by taking an example in a rear seat of a passenger vehicle. In the following disclosure, the terms "upper", "lower", "right", "left", "front" and "rear" are defined by the view of an occupant seated in the rear seat. Certain components are provided in a symmetric manner or as mirror images of one another, and in regard to such components, only one of a pair of symmetric components may be discussed as the pair are mirror images of one another. The term "connect" as used in this disclosure shall mean all modes of connection including, not exclusively, welding, using fasteners such as bolts and rivets, and using bonding agents.

Figure 1:
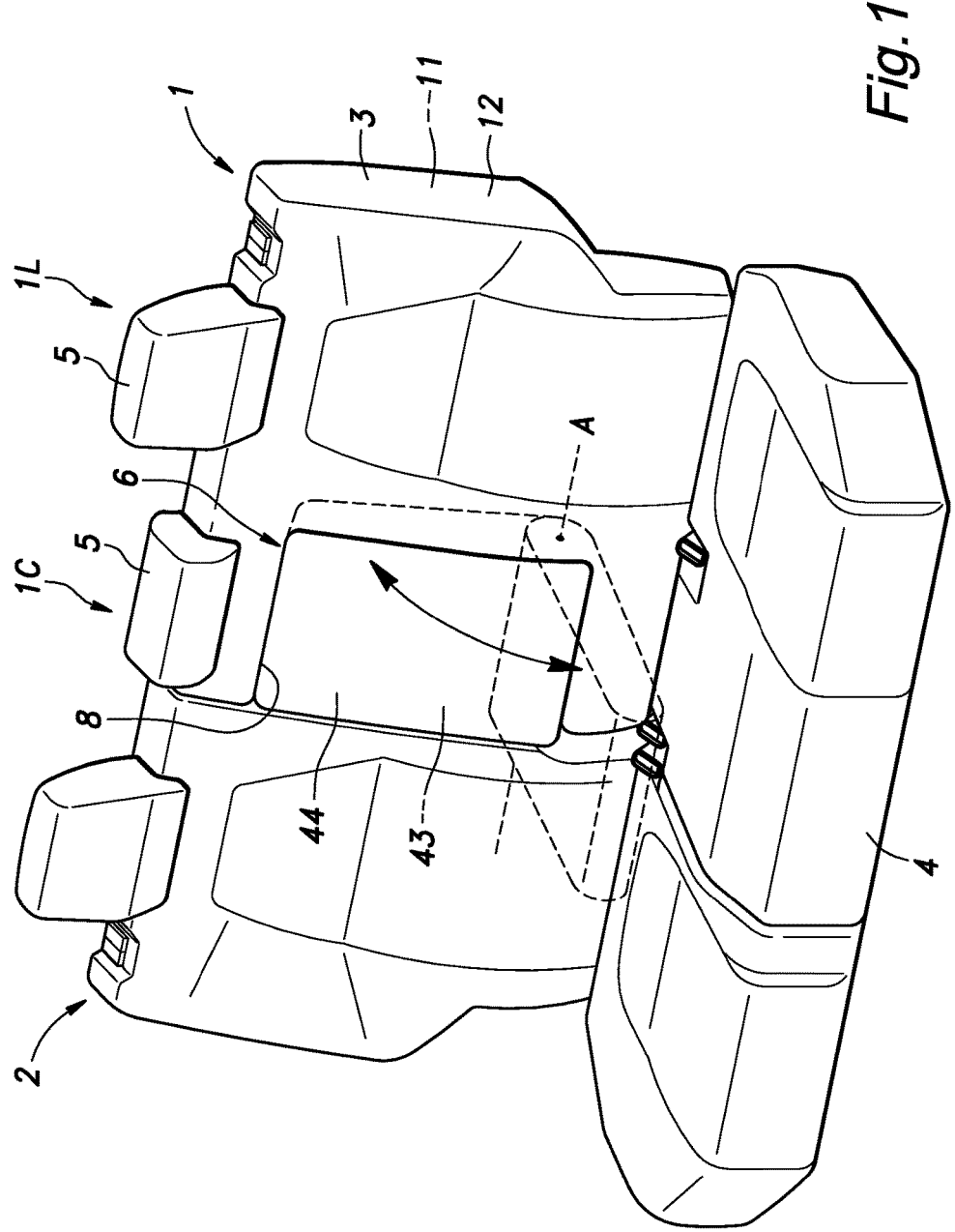
FIG. 1 is a perspective view of an embodiment of a vehicle seat according to the present invention.

FIG. 1 shows a rear seat assembly that seats three occupants, and includes a pair of mutually separated seat parts 1 and 2 that are placed one next to the other in the manner of a conventional bench seat. One of the seat parts 1 serves as a left seat 1L and a center seat 1C while the other seat part 2 serves as a right seat R. In the following description, the first seat part 1 is referred to as "seat 1" for the purposes of description.

The seat 1 includes a seat back 3, a seat cushion 4, a head rest 5 and an arm rest 6. The lower end of the seat back 3 is pivotally connected to a floor panel F of the vehicle at the lower end thereof around a pivot center extending laterally along the floor panel F. A central front part of the seat back 3 corresponding to the center seat 1C is formed with a rectangular recess 8 receiving the arm rest 6 therein. The arm rest 6 is pivotally connected to the seat back 3 via a pivot center line A extending laterally between a deployed position (indicated by dotted lines) extending in the forward direction and a retracted position (indicated by solid lines) received in the recess 8.

Figure 2:
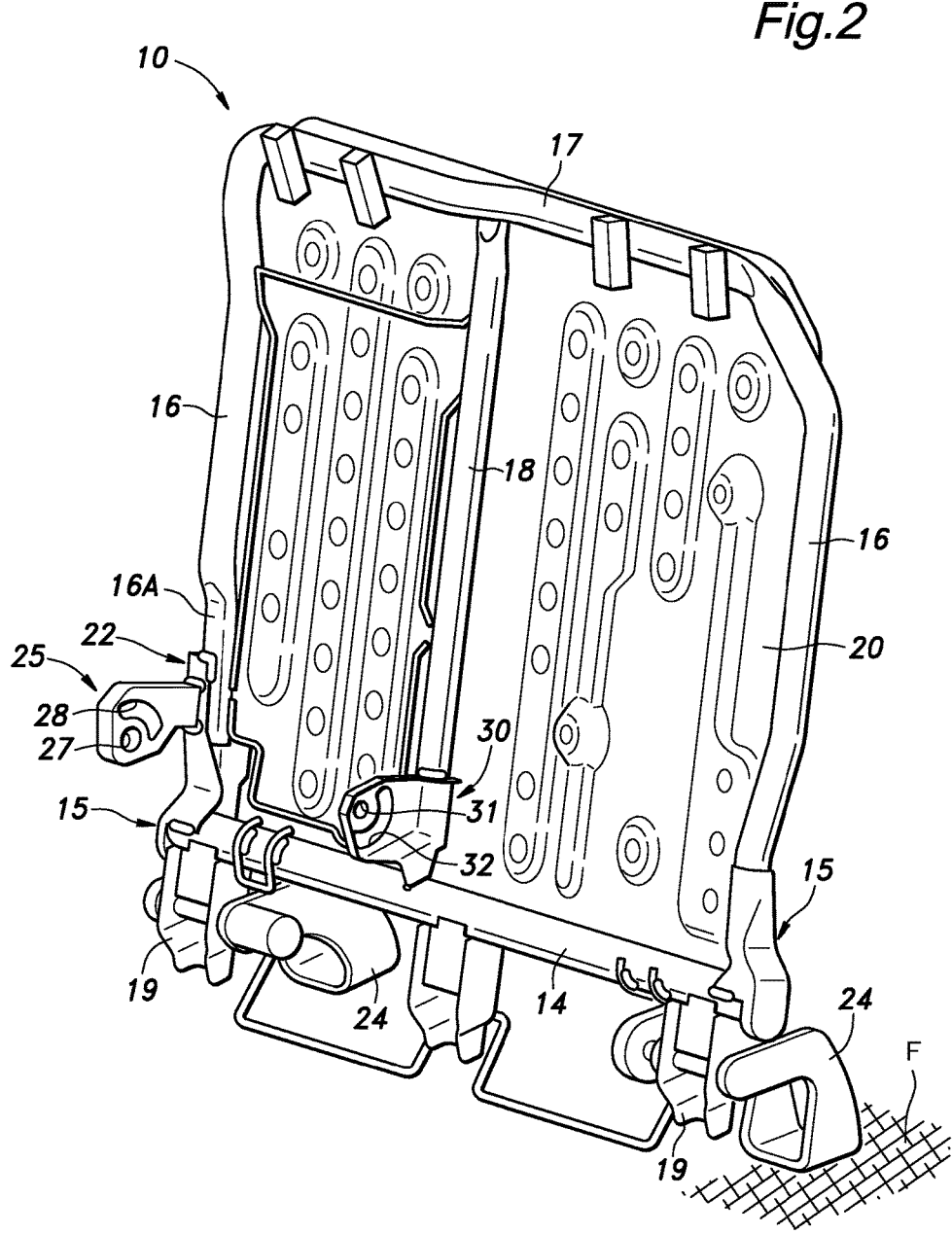
FIG. 2 is a perspective view of a seat back frame of the vehicle seat.
Figure 3:
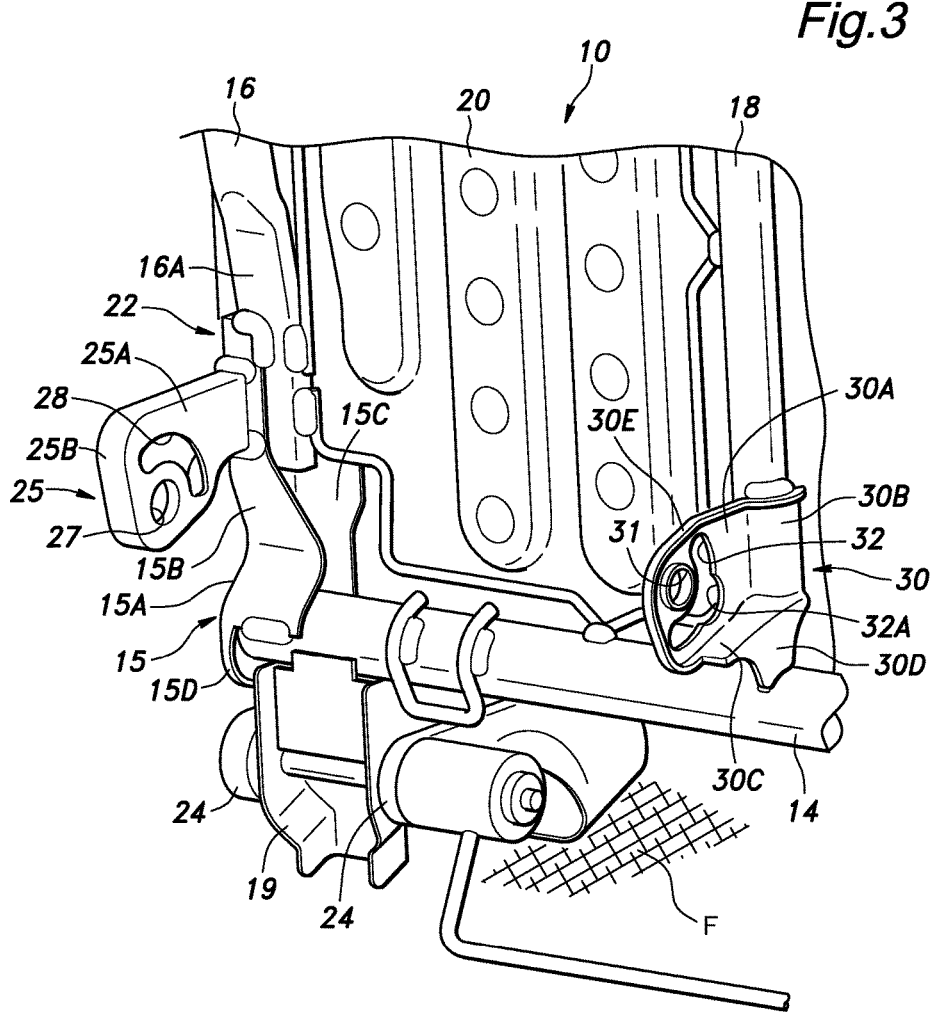
FIG. 3 is an enlarged perspective view of a part of the seat back frame.

The seat back 3 includes a seat back frame 10, a pad 11 supported by the seat back frame 10 and a skin member 12 covering the pad 11 and the seat back frame 10. As shown in FIGS. 2 and 3, the seat back frame 10 includes a lower cross frame 14, a pair of lower back side frames 15 extending upward from the respective lateral ends of the lower cross frame 14, a pair of upper back side frames 16 extending upward from the upper ends of the respective lower back side frames 15, and an upper cross frame 17. The seat back frame 10 additionally includes a center frame 18 extending vertically between intermediate parts of the lower cross frame 14 and the upper cross frame 17, a pair of base members 19 projecting downward from the respective lateral ends of the lower cross frame 14, and a seat back pan frame 20 attached to the rear side of a frame structure formed by the lower cross frame 14, the lower back side frames 15, the upper back side frames 16 and the upper cross frame 17.

The lower cross frame 14 is made of metallic pipe having a circular cross section, and extends linearly in the lateral direction. The upper back side frames 16 are formed by bending the metallic pipe forming the upper cross frame 17 downward at the respective lateral ends thereof. The lower end of the right upper back side frame 16 is formed as a flattened portion 16A (having a major plane facing forward) by compressing or collapsing the lower end of the metallic pipe from the fore and aft directions.

As best shown in FIG. 3, the lower back side frames 15 are formed by stamp forming sheet metal, and each include a side wall 15A having a laterally facing major plane, a front wall 15B bent inwardly from the front edge of the side wall 15A and having a major plane facing in the fore and aft direction, a rear wall 15C bent inwardly from the rear edge of the side wall 15A and having a major plane facing in the fore and aft direction, and a bottom wall 15D bent inwardly from the bottom edge of the side wall 15A. The bottom edge of the side wall 15A is arcuate in shape with a convex side facing downward so that the bottom wall 15D curves in an arcuate manner with a convex side thereof facing downward. The lower end of the front wall 15B is connected to the front edge of the bottom wall 15D, and the lower end of the rear wall 15C is connected to the rear edge of the bottom wall 15D. The lateral width of the front wall 15B is greater than that of the bottom wall 15D so that a part of the bottom edge of the front wall 15B forms a downwardly directed free end.

The lower back side frame 15 is generally provided with a channel shape defined by the front wall 15B, the side wall 15A and the rear wall 15C with an open side facing inward or facing the center frame 18.

The flattened portion 16A of the right upper back side frame 16 is fitted into the channel-shaped lower back side frame 15 from above so as to create an overlapping portion 22 where the corresponding ends of the upper back side frame 16 and the lower back side frame 15 overlap each other along both the lateral direction and the fore and aft direction as well as along the vertical direction, and are welded to each other at this overlapping portion 22.

The lateral ends of the lower cross frame 14 are fitted into the lower parts of the channel-shaped respective lower back side frames 15. Each lateral end of the lower cross frame 14 is welded to the downwardly directed free end part of the bottom edge of the front wall 15B.

As shown in FIGS. 2 and 3, the base members 19 are made by stamp forming sheet metal, and are each formed as a vertically extending channel member having an open end facing forward. The base members 19 are fixedly secured to the lower cross frame 14 at the upper ends thereof, and pivotally supported by a pair of support arms 24 fixedly secured to the floor panel F around a pivot center extending laterally.

The center frame 18 is made of metallic pipe having a circular cross section, and extends vertically. The upper and lower ends of the center frame 18 are pressed from the fore and aft directions into a flattened configuration. The flattened upper end of the center frame 18 is welded to the rear side of the upper cross frame 17 and the flattened lower end of the center frame 18 is welded to the rear side of the lower cross frame 14. The center frame 18 separates the left seat 1L and the center seat 1C from each other.

As shown in FIG. 3, a right bracket 25 is attached to an upper end part of the front wall 15B of the right lower back side frame 15 where the flattened portion 16A of the lower end of the right upper back side frame 16 overlaps with the front wall 15B. The right bracket 25 is made by stamp forming sheet metal, and includes a main body 25A having a major plane facing laterally, and a right bracket flange 25B extending rightward from the upper, front and lower edges of the main body 25A in a substantially orthogonal relationship. The rear edge of the right bracket 25 (the main body 25A and the upper and lower rear ends of the right bracket flange 25B) abuts and is welded to the front wall 15B of the lower back side frame 15 or the overlapping portion 22.

Figure 4:
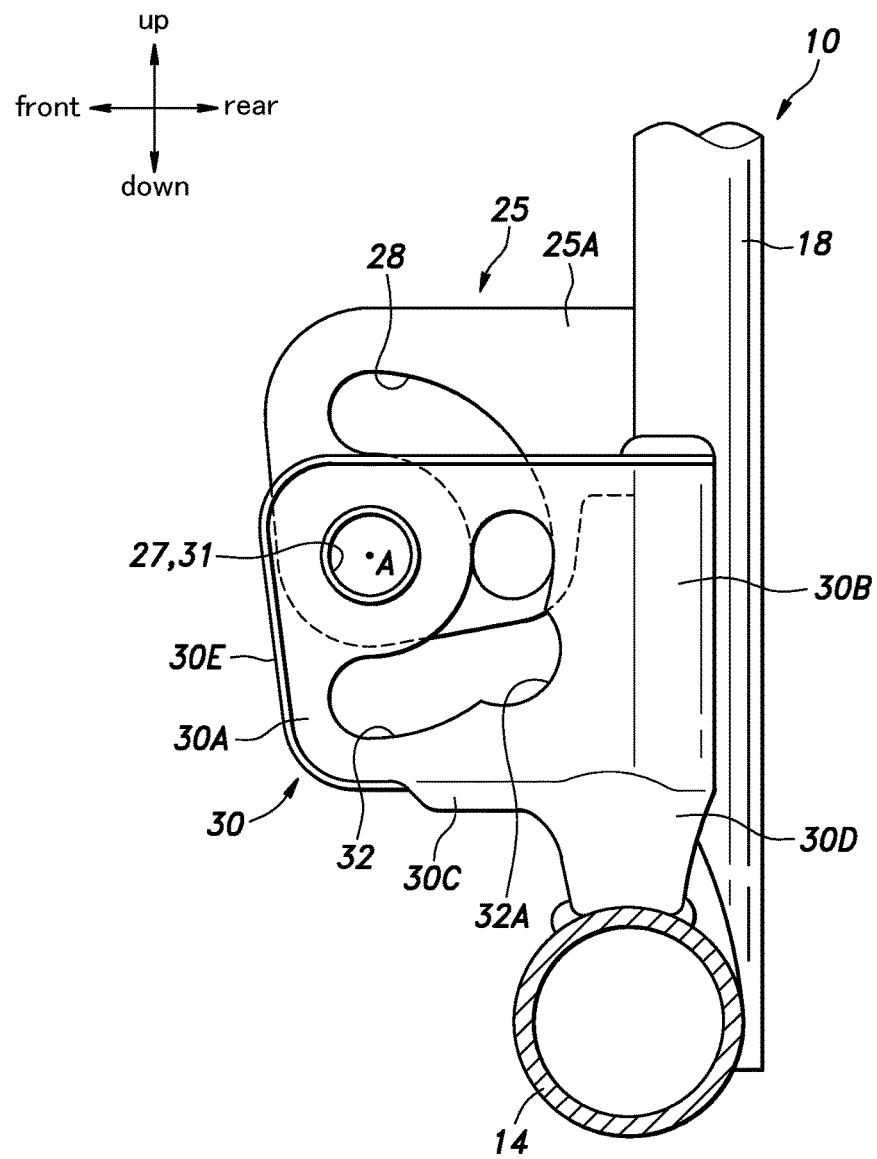
FIG. 4 is a left side view of a pair of brackets showing the positional relationship between the two brackets.

As shown in FIGS. 3 and 4, the front part of the right bracket 25 extends downward further than the rear part thereof. A right support hole 27 is laterally passed through a lower front part of the main body 25A of the right bracket 25. An arcuate right guide slot 28 centered around the right support hole 27 is formed in the main body 25A so as to extend from a part above the right support hole 27 to a part behind the right support hole 27 over an angular range of about 90 degrees.

As shown in FIG. 3, a left bracket 30 is attached to the lower part of the center frame 18 and an adjoining part of the lower cross frame 14. The left bracket 30 is made by stamp forming sheet metal, and includes a main body 30A having a major plane facing laterally, a rear connecting portion 30B bent into a semi cylindrical configuration so as to corresponds to a side surface of the center frame 18, a shelf wall 30C extending leftward from the lower edge of the main body 30A and having a vertically facing major plane, a lower connecting portion 30D extending downwardly from the left edge of the shelf wall 30C and having a lower edge of a semicircular concave shape, and a left bracket flange 30E bent from upper edges of the main body 30A and the rear connecting portion 30B and the front edge of the main body 30A in the leftward direction in a continuous manner along the periphery of the left bracket 30. The upper edge of the rear connecting portion 30B is welded to the center frame 18, and the lower edge of the lower connecting portion 30D is welded to the lower cross frame 14. The rear edge of the shelf wall 30C is connected to the lower edge of the rear connecting portion 30B such that the main body 30A, the shelf wall 30C and the lower connecting portion 30D jointly define a three dimensional geometry. Thus, the left bracket 30 is connected to both the center frame 18 and the lower cross frame 14 such that the left bracket 30 serves as a gusset for the junction between the center frame 18 and the lower cross frame 14.

As shown in FIGS. 3 and 4, the main body 30A of the left bracket 30 is downwardly offset relative to the main body 25A of the right bracket 25 in side view. In particular, the upper edge of the left bracket main body 30A is located between the upper and lower edges of the right bracket main body 25A, and the lower edge of the left bracket main body 30A is located below the lower edge of the right bracket main body 25A. In other words, an upper part of the left bracket main body 30A aligns with a middle part of the right bracket main body 25A in side view.

A left support hole 31 is laterally passed through an upper front part of the main body 30A of the left bracket 30 so as to align with the right support hole 27 of the right bracket 25 in a coaxial manner in side view. An arcuate left guide slot 32 centered around the left support hole 31 is formed in the main body 30A so as to extend from a part below the left support hole 31 to a part behind the left support hole 31 over an angular range of about 90 degrees. An intermediate part of the left guide slot 32 is locally enlarged in a radially outward direction as an enlarged portion 32A.

As shown in FIG. 4, the left guide slot 32 is positioned generally lower than the right guide slot 28, and the rear ends of the right and left guide slots 28 and 32 coincide with each other. In the illustrated embodiment, the right and left guide slots 28 and 32 have a same radius of curvature. Alternatively, the right and left guide slots 28 and 32 may have different radii of curvature without departing from the spirit of the present invention.

Figure 5:
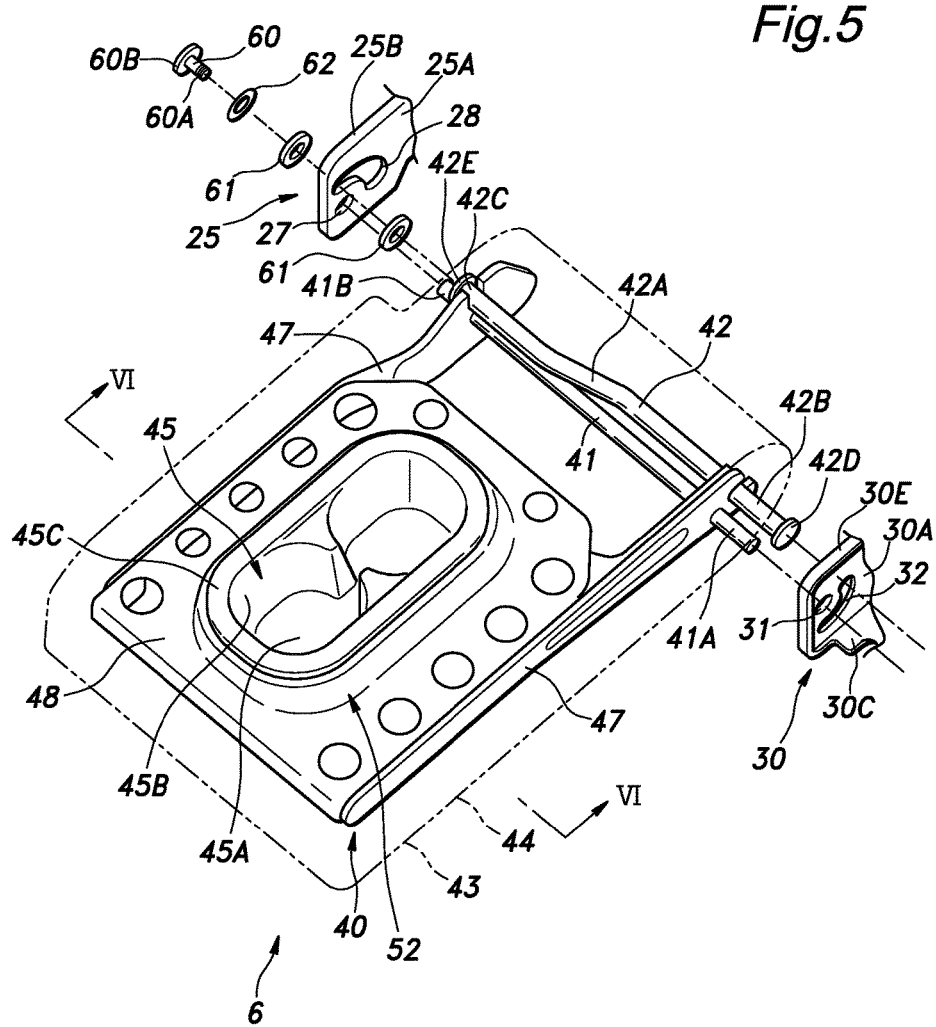
FIG. 5 is a see-through exploded perspective view of an arm rest frame.
Figure 6:
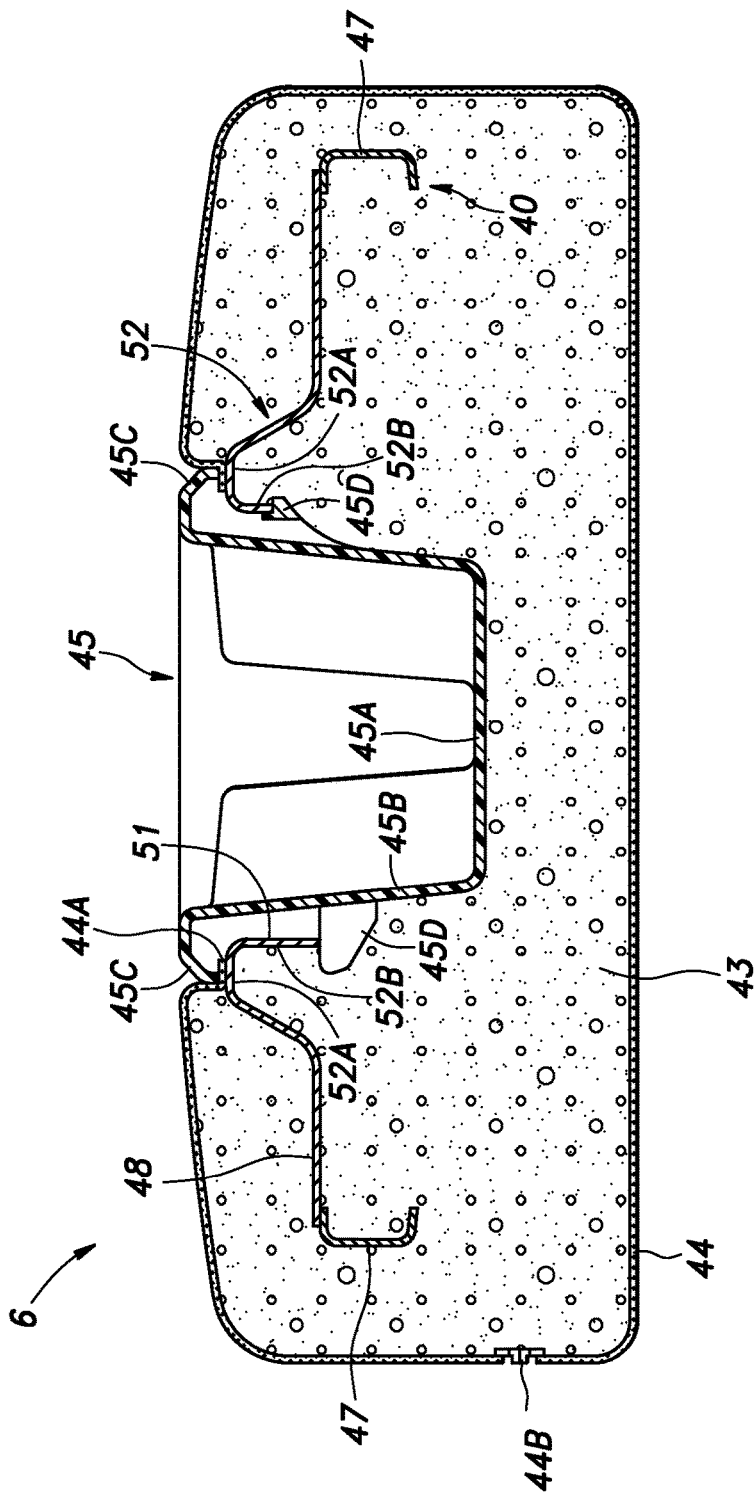
FIG. 6 is a sectional view taken along line VI-VI of FIG. 5.

As shown in FIGS. 5 and 6, the arm rest 6 includes an arm rest frame 40, a support shaft 41 fixedly attached to the arm rest frame 40, a pad 43 supported by the arm rest frame 40, a skin member 44 covering the arm rest frame 40 and the pad 43, and a cup holder 45 attached to the arm rest frame 40.

The arm rest frame 40 includes a pair of arm rest side frames 47 extending from the base end to the free end of the arm rest 6, and an arm rest pan 48 extending between the free ends of the arm rest side frames 47. Each arm rest side frame 47 consists of a channel member having an open side facing the other arm rest side frame 47. The arm rest pan 48 is generally planar (and extends substantially horizontally in the deployed position of the arm rest 6), and is attached to the arm rest side frames 47 along the respective side edges of the arm rest pan 48.

The arm rest pan 48 is provided with a receiving hole 51 passed through the arm rest pan 48 for receiving a cup holder 45. The receiving hole 51 is defined by a downwardly directed annular flange 52B (extending in the axial direction), and is surrounded by a raised annular wall 52A defining an annular top surface perpendicular to the axial center line of the annular flange 52B. The annular flange 52B may extend continuously over the entire periphery of the receiving hole 51, or may consist of a plurality of discrete flange sections arranged along the periphery of the receiving hole 51.

As shown in FIG. 5, the support shaft 41 consists of a linear rod having a circular cross section, and is fixedly secured to the base ends of the arm rest side frames 47. The two lateral ends 41A and 41B of the support shaft 41 are passed through the respective arm rest side frames 47, and project outwardly from the outer sides of the respective arm rest side frames 47. A guide shaft 42 consisting of a rod having a circular cross section are also passed through the respective arm rest side frames 47, and project outwardly from the outer sides of the respective arm rest side frames 47. In the illustrated embodiments, the upper edge and the rear edge of the respective arm rest side frames 47 are formed with notches, and two lateral ends 42B and 42C of the guide shaft 42 are fitted into these notches. The two ends 42B and 42C may be press fitted, welded or otherwise fixedly secured to the respective arm rest side frames 47. A bend 42A is provided in an intermediate part of the guide shaft 42 in such a manner that the left end 42B and the right end 42C of the guide shaft 42 extend linearly and parallel to each other with a certain offset.

In the deployed condition of the arm rest 6, the right end 42C of the guide shaft 42 is positioned higher and more forward than the left end 42B of the guide shaft 42. Also, the right end 42C of the guide shaft 42 is positioned immediately above the right end 41B of the support shaft 41, and the left end 42B of the guide shaft 42 is positioned immediately behind the left end 41A of the support shaft 41. The left end 42B of the guide shaft 42 is integrally formed with a left radial flange 42D, and the right end 42C of the guide shaft 42 is integrally formed with a right radial flange 42E. The diameter of the left radial flange 42D is greater than the width of the left guide slot 32, but is smaller than the width of the enlarged portion 32A. The diameter of the right radial flange 42 is greater than the width of the right guide slot 28.

As shown in FIG. 6, the pad 43 fills the space around the arm rest frame 40, the support shaft 41 and the guide shaft 42. The pad 43 may consist of urethane foam insert molded around the arm rest frame 40, the support shaft 41 and the guide shaft 42. The pad 43 is absent inside the annular flange 52B, and above the raised annular wall 52A to define a space for accommodating the cup holder 45. The skin member 44 covering the pad 43 is provided with a hole 44A in a part thereof corresponding to the receiving hole 51. The part of the skin member 44 located along the periphery of the hole 44A is positioned on the surface of the raised annular wall 52A. The skin member 44 is formed as a bag, and the opening thereof is closed by a fastener 44B such as snap buttons, a zipper, and a hook and loop fastener. The fastener 44B may be positioned in a relatively inconspicuous part of the arm rest 6 such as a side part thereof. The left end 41A and the right end 41B of the support shaft 41, and the left end 42B and the right end 42C of the guide shaft 42 are passed through the skin member 44, and project outwardly from the skin member 44.

The cup holder 45 includes a bottom wall 45A, a side wall 45B extending upward from the periphery of the bottom wall 45A, and a flange 45C extending outwardly from the upper edge of the side wall 45B. The flange 45C is annular in shape, and extends horizontally in the deployed state of the arm rest 6. As shown in FIG. 6, a plurality of engagement claws 45D are formed on the outer side of the side wall 45B. Thus, when the bottom wall 45A and the side wall 45B of the cup holder 45 are fitted into the receiving hole 51, the outer periphery of the flange 45C abuts the raised annular wall 52A via the skin member 44 so that the cup holder 45 is properly positioned in the arm rest 6, and the skin member 44 is retained along the outer edge of the cup holder 45. At the same time, the engagement claws 45D engage the lower edge of the annular flange 52B so that the cup holder 45 is retained in the receiving hole 51, and is prevented from being dislodged from this position.

As shown in FIG. 5, the left end 41A of the support shaft 41 is rotatably supported by the left support hole 31 of the left bracket 30, and the right end 41B of the support shaft 41 is rotatably supported by the right support hole 27 of the right bracket 25. Thereby, the arm rest 6 is supported by the seat back 3 in a rotatable manner around the pivot center line A of the support shaft 41. The left end 42B of the guide shaft 42 is received in the left guide slot 32 so as to move along an arcuate path centered around the pivot center line A of the support shaft 41. The left end 42B of the guide shaft 42 can be installed in the left guide slot 32 from the enlarged portion 32A. Once the left end 42B of the guide shaft 42 is received in the left guide slot 32, the left radial flange 42D prevents the left end 42B from being dislodged from the left guide slot 32.

The right end 42C of the guide shaft 42 fitted with the radial flange 42E is formed with a coaxial threaded hole (not shown in the drawings), and a shaft extension 60 having a threaded rod 60A and a head 60B is threaded into this threaded hole via a washer 62 and a pair of annular frictional members 61 which are positioned in that order from the head 60B of the shaft extension 60. The head 60B of the shaft extension 60 has a diameter greater than the width of the right guide slot 28.

The frictional members 61 are made of a high frictional coefficient material, and are positioned on either side of the main body 25A of the right bracket 25. In other words, the main body 25A of the right bracket 25 is interposed between the two frictional members 61. By threading the threaded rod 60A of the shaft extension 60, the lateral position of the guide shaft 42 and, hence, the arm rest 6 relative to the seat back 3 is determined. The frictional members 61 create a frictional force in cooperation with the main body 25A of the right bracket 25 so that the arm rest 6 may be held stationary at any desired angular position. This frictional force can be adjusted by changing the axial pressure applied to the frictional members 61 by turning the shaft extension 60 relative to the guide shaft 42.

The fully deployed position of the arm rest 6 can be determined by the abutting of the left end 42B of the guide shaft 42 with the upper end of the left guide slot 32, and by the abutting of the shaft extension 60 with the front end of the right guide slot 28. The fully retraced position of the arm rest can be determine by the abutting of the left end 42B of the guide shaft 42 with the front end of the left guide slot 32, and by the abutting of the shaft extension 60 with the lower end of the right guide slot 28.

In the seat 1 of the illustrated embodiment, because the left end 42B and the right end 42C (shaft extension 60) of the guide shaft 42 are offset from each other, and the left guide slot 32 and the right guide slot 28 are offset from each other in a corresponding manner, the left bracket 30 and the right bracket 25 may be arranged in a mutually offset relationship. As a result, the freedom in the layout of the left bracket 30 and the right bracket 25 can be improved. In the illustrated embodiment, the overlapping portion 22 between the upper back side frame 16 and the lower back side frame 15 has a relatively high mechanical stiffness, and the junction between the center frame 18 and the lower cross frame 14 also has a relatively high stiffness, but these parts are located at different elevations. However, according to the present invention, the left and right brackets 30 and 25 may be attached to these relatively stiff parts of the seat back 3 which are located at different elevations, and the support shaft 41 may still be supported by the left and right brackets 30 and 25 around a common pivot center which extends horizontally in the lateral direction.

As the guide shaft 42 having the left end 42B and the right end 42C which are offset from each other in a mutually parallel relationship is made of a single piece member, the stiffness of the guide shaft 42 can be ensured while minimizing the weight and the material cost of the guide shaft 42. Also, the number of component parts can be reduced. Furthermore, as the guide shaft 42 and the support shaft 41 extend between the base ends of the arm rest side frames 47, the stiffness of the arm rest frame 40 can be maximized.

Although the present invention has been described in terms of a preferred embodiment thereof, it is obvious to a person skilled in the art that various alterations and modifications are possible without departing from the scope of the present invention.

The invention claimed is:

1. A vehicle seat, comprising:
   a seat back frame;
   an arm rest frame;
   a pair of support pins fixedly attached to the arm rest frame, and projecting in either lateral direction;
   a pair of guide pins fixedly attached to the arm rest frame, and projecting in either lateral direction;
   a pair of brackets provided on either side of the seat back frame, each bracket defining a support hole for rotatably supporting a corresponding one of the support pins and a guide slot for guiding a corresponding one of the guide pins along an arcuate path centered around a center of the corresponding support hole;
   wherein the two brackets are offset from each other, and the two support holes are coaxial to each other in side view; and
   wherein the two guide slots are offset from each other, and the guide pins are offset from each other in a corresponding manner in side view.

2. The vehicle seat according to claim 1, wherein the guide pins are formed by two lateral ends of a guide shaft having a bend in an intermediate part thereof so that the two lateral ends are offset relative to each other in a parallel relationship.

3. The vehicle seat according to claim 2, wherein the arm rest frame includes a pair of side frames extending along either side of the arm rest frame, and the guide shaft is fixedly attached to the side frames.

4. The vehicle seat according to claim 3, wherein the support pins are formed by two lateral ends of a support shaft which is fixedly attached to the side frames.

5. The vehicle seat according to claim 1, wherein the seat back frame includes a lower cross frame extending laterally in a lower part of the seat back frame, a first side frame including an upper side frame and a lower side frame which are joined to each other at a mutually overlapping portion, and connected to the lower cross frame at a lower end of the lower side frame, a second side frame having a lower end connected to the lower cross frame at a junction located at a lower elevation than the overlapping portion, and an upper cross frame having two lateral ends connected to upper ends of the upper side frame and the second side frame, respectively, wherein one of the brackets is attached to the overlapping portion, and the other bracket is attached to the junction between the second side frame and the lower cross frame.

6. The vehicle seat according to claim 5, wherein the lower side frame comprises a channel member having an open side facing the second side frame, and a lower end of the upper side frame is received in the open side of the lower side frame at the overlapping portion, wherein the one bracket is attached to the lower side frame at the overlapping portion.

7. The vehicle seat according to claim 6, wherein the upper cross frame and the upper side frame are formed by a single continuous pipe member.

8. The vehicle seat according to claim 6, wherein the seat is configured to seat two occupants, and the second side frame consists of a center frame positioned centrally in the seat.

9. The vehicle seat according to claim 1, wherein the support hole of one of the brackets is located adjacent to a lower edge thereof, and the corresponding guide slot extends in a generally upper part of the one bracket, and the support hole of the other bracket is located adjacent to an upper edge thereof, and the corresponding guide slot extends in a generally lower part of the other bracket.

10. The vehicle seat according to claim 9, wherein the lower edge of the one bracket extends further downward in a free end part where the support hole is formed than a base end part where the one bracket is attached to the overlapping portion.

11. The vehicle seat according to claim 1, wherein one of the support pins is provided with a frictional member and a shaft extension configured to apply an axial force that urges the frictional member against the corresponding bracket.

12. The vehicle seat according to claim 1, wherein one of the guide slots is provided with an enlarged portion, and the corresponding guide pin is provided with a radial flange at a free end side thereof, the radial flange having a diameter smaller than a width of the enlarged portion but greater than a width of a remaining part of the guide slot.

* * * * *